(12) United States Patent
Marcori et al.

(10) Patent No.: US 9,759,395 B2
(45) Date of Patent: Sep. 12, 2017

(54) LIGHTING DEVICE FOR VEHICLES AND PRODUCTION METHOD THEREOF

(71) Applicant: AUTOMOTIVE LIGHTING ITALIA S.p.A. A SOCIO UNICO, Venaria Reale, Turin (IT)

(72) Inventors: Franco Marcori, Turin (IT); Maria Chiara Frijia, Turin (IT); Igor Di Vora, Turin (IT); Fabio Leone, Turin (IT)

(73) Assignee: Automotive Lighting Italia S.p.A. a Socio Unico, Turin (IT)

( * ) Notice: Subject to any disclaimer, the term of this patent is extended or adjusted under 35 U.S.C. 154(b) by 66 days.

(21) Appl. No.: 14/222,907

(22) Filed: Mar. 24, 2014

(65) Prior Publication Data
US 2014/0286031 A1 Sep. 25, 2014

(30) Foreign Application Priority Data
Mar. 25, 2013 (IT) .............................. PD2013A0075

(51) Int. Cl.
*B29D 11/00* (2006.01)
*F21S 8/10* (2006.01)
(Continued)

(52) U.S. Cl.
CPC ........ *F21S 48/00* (2013.01); *B29D 11/00798* (2013.01); *F21S 48/1225* (2013.01); *F21S 48/1241* (2013.01); *F21S 48/2212* (2013.01); *F21S 48/2225* (2013.01); *G02B 5/0247* (2013.01); *G02B 6/0041* (2013.01); *G02B 6/0051* (2013.01)

(58) Field of Classification Search
CPC ........................... G02B 5/0247; F21S 48/1241
See application file for complete search history.

(56) References Cited

U.S. PATENT DOCUMENTS

| 4,473,665 | A | * | 9/1984 | Martini-Vvedensky ................... B29C 44/34 264/237 |
| 5,390,436 | A | * | 2/1995 | Ashall .................. G02B 6/0043 362/618 |

(Continued)

FOREIGN PATENT DOCUMENTS

| DE | 102 14 505 A1 | 10/2003 |
| GB | 2 105 025 A | 8/1982 |

(Continued)

OTHER PUBLICATIONS

Nov. 25, 2013 Search Report for IT PD20130075.

*Primary Examiner* — Jong-Suk (James) Lee
*Assistant Examiner* — Eric T Eide
(74) *Attorney, Agent, or Firm* — Howard & Howard Attorneys PLLC

(57) ABSTRACT

The present invention relates to a lighting device for vehicles including at least one diffuser body suitable for receiving light emitted by a light source so as to diffuse the light externally to the body. The diffuser body includes a solid matrix of transparent polymer material which incorporates a plurality of bubbles or cavities, wherein the solid matrix performs the transmission of light within the body by subsequent reflections and wherein the bubbles perform the diffusion of light and the extraction thereof outside the body by subsequent refractions.

9 Claims, 3 Drawing Sheets

(51) Int. Cl.
*G02B 5/02* (2006.01)
*F21V 8/00* (2006.01)

(56) References Cited

U.S. PATENT DOCUMENTS

| | | | |
|---|---|---|---|
| 2003/0118750 A1 | 6/2003 | Bourdelais et al. | |
| 2004/0066556 A1* | 4/2004 | Dontula | G02B 5/0221 359/599 |
| 2006/0204744 A1* | 9/2006 | Hiraishi | G02B 5/0231 428/327 |
| 2008/0070998 A1* | 3/2008 | Takada | C08J 9/04 521/50.5 |
| 2012/0257401 A1 | 10/2012 | Wilfert | |
| 2013/0003412 A1* | 1/2013 | Yagi | G02B 6/0065 362/611 |

FOREIGN PATENT DOCUMENTS

| | | |
|---|---|---|
| JP | 2006-124499 A | 5/2006 |
| JP | 2006-155937 A | 6/2006 |
| WO | 2006/079947 A1 | 8/2006 |

\* cited by examiner

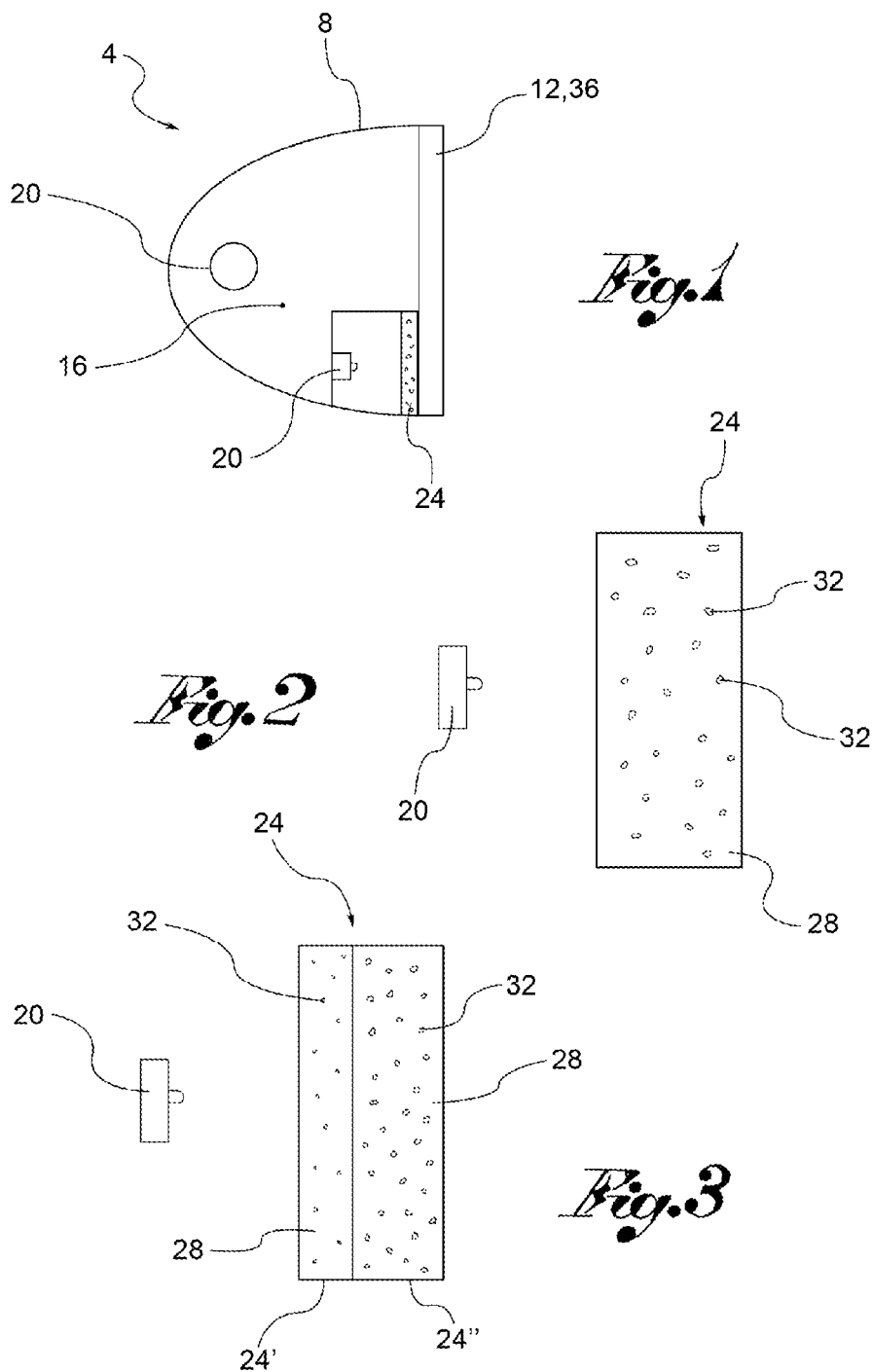

LIGHTING DEVICE FOR VEHICLES AND PRODUCTION METHOD THEREOF

CROSS-REFERENCE TO RELATED APPLICATION

This application is based upon and claims priority to Italian Patent Application PD2013A000075 filed on Mar. 25, 2013.

BACKGROUND OF THE INVENTION

1. Field of the Invention

The present invention relates to lighting devices for automotive vehicles and the production method thereof.

2. Description of the Related Art

As known in the art, an automotive light is a lighting and/or signaling device of a vehicle including at least one vehicle outer light having a function of lighting and/or signaling to the outside, such as a position light, a direction indicator light, a brake light, a rear fog light, a reversing light, a low beam, a high beam, and the like. The terms "lighting device" and "signaling device" denote an automotive headlight and, in particular, both an automotive signal light and an automotive headlight, also called a projector, as well as further lighting and/or signaling devices for vehicles, such as ceiling lights and the like. The term "headlight" denotes a lighting device for vehicles includes a lighting and/or signaling device of a vehicle that include at least one light having a lighting and/or signaling function.

The lighting and/or signaling device, in its most simple form, includes a container body, a lenticular body, and at least one light source. The lenticular body is placed for closing a mouth of the container body so as to form a housing chamber. The light source is arranged within the housing chamber and can be oriented so as to emit light towards the lenticular body when powered with electricity. Within the housing chamber, the lighting and/or signaling devices may include light guides or further lenticular bodies having optical properties when associated to a light source, such as filters or lenses. In some cases, in order to achieve a particular diffusion of light output by the lighting and/or signaling device, one or more of the lenticular body and the light guide are made with transparent materials molded on embossed surfaces. Embossed surfaces may be front or rear surfaces, or both, of the lenticular body or light emitting surfaces of the light guide.

The embossing of the mold is replicated by a fluid plastic material, which retains the rough structure of the surface after the polymer freezes. The result is that the lenticular body or light guide, the surface of which is structured with a determined roughness, optically diffuses the light that it receives from the source that illuminates it. The technological difficulty associated with the use of this surface embossing molding replication technique is that the quality of the replica is strongly dependent on the retaining pressure, during the freezing step of the molten polymer into the mold cavity. In fact, insufficient pressure applied during compaction of the material leads to volumetric shrinkage resulting from the freezing of the plastic, which makes replication of the embossing inconsistent. This effect is even more pronounced when the lenticular body or the light guide are larger and thicker, and when the injection point is farther away. Moreover, with this technique it is difficult to retain the diffusive optical characteristics of the molding product over time, since the wear of the mold can alter the embossing, and the mold with embossed surface cannot be polished, thus necessitating a much more complex maintenance schedule requiring the re-execution of the mold surface.

In order to overcome this drawback, in some cases it is possible to use inherently opal materials, such as PLEXIGLAS® Satin Ice by Evonik, in which the polymer granule is admixed with microspheres of polymeric material with different refractive index dispersed in the volume of the granule itself. The different refractive index between the master material and diffused microspheres causes the incident light to deviate its direction of rectilinear propagation (typical of the homogeneous medium), thus affecting another microsphere or exiting from the surface of the plastic with an altered direction. This phenomenon causes the opalescence of the base material and, thus, also that of the moulded material.

This type of technique, which employs polymeric microspheres dispersed in a matrix of another transparent polymer with a different refractive index, overcomes the imperfect replication of the embossing described above, ensuring a homogeneous distribution of the opalescence in transmission, which only depends on the concentration of microspheres in the matrix and the thickness of the lenticular body or the size of the light guide (greater thickness=greater opalescence).

Moreover, because the surfaces of the lenticular body or of the light guide can be smooth, since the opalescence characteristic is given by the volume of the material and not by its surface, it is possible to maintain the surfaces of the molds with a simple mechanical polishing process.

Finally, unlike the optical behavior of the homogeneous transparent material with an embossed surface, the opalescent polymer with microspheres diffuses the incident light from its volume and not from its surface, thus giving the illuminated material a fuller, more uniform and more transparent appearance. Specifically, the light is diffused from the inside of the material; not only from its surface.

However, opaline material with dispersed microspheres encounters two obstacles to its introduction in the automotive field. A first obstacle is regulatory in nature: some fundamental and unavoidable standardized acceptance tests of the materials for lighting and signaling on the North American territory (USA and Canada) require that the virgin material (granule) for optical use to have a very high light transmission without diffusion. Inherently, the polymer with diffusing microspheres is specially formulated to diffuse the light is unusable. On the other hand, a transparent material used for molding with embossed mold imprint is transparent and, therefore, acceptable for the North American market. This opens a problem of marketability of vehicles throughout the world, and forces the use of two types of equipment and two different materials; a mold with embossed surfaces and the use of the standard transparent material for the North American market, and a mold with smooth surfaces and the use of the material with microspheres for the other markets. Utilizing two different types of equipment negatively impacts cost, productivity, and product quality.

A second obstacle comes from the fact that different lenticular bodies, or likewise different light guides having a diffusing optical behavior, must be respectively formed with different materials with microspheres. More precisely, a material with microspheres suitable for forming a lenticular body having a first thickness can be obtained using plastic material with a first particle size of microspheres. A material with microspheres suitable for forming a lenticular body having a second thickness can be obtained using plastic material having a second particle size of microspheres. This constitutes a problem for the manufacturers of goods provided with components formed with the material in microspheres, since the choice regarding the particle size of microspheres can be made only in the procurement step of the plastic material.

Disadvantageously, moreover, the usual methods of production allow only materials with microspheres having a homogeneous structure to be obtained. In other words, the density and/or size of the microspheres is substantially constant within all the material with microspheres.

SUMMARY OF THE INVENTION

The present invention overcomes the disadvantages in the related art in a lighting device for vehicles. The lighting device includes a light source structured so as to emit light when powered with electricity. The lighting device also includes at least one diffuser body suitable for receiving the light emitted by the light source and diffusing said the externally to the diffuser body, wherein the diffuser body includes a solid matrix in transparent polymer material which encompasses a plurality of bubbles or cavities. The solid matrix performs the transmission of the light inside the diffuser body and the bubbles or cavities perform the diffusion of the light and its extraction outside the diffuser body by subsequent refraction.

In addition, the present invention is directed toward a production method of a lighting device for vehicles including the steps of: molding a diffuser body by melting a matrix of a transparent, semi-transparent, or translucent material and an injection of a foaming agent in the matrix in the molten state, so as to cause the formation of bubbles or cavities inside the matrix; and joining the molded diffuser body to a light source structured so as to emit light when powered with electricity, where the diffuser body is suitable for receiving and distributing light emitted by the light source.

BRIEF DESCRIPTION OF THE DRAWINGS

Other objects, features, and advantages of the present invention will be readily appreciated as the same becomes better understood after reading the subsequent description take n in connection with the accompanying drawings wherein:

FIG. 1 shows a schematic sectional view of a lighting device according to one embodiment of the present invention;

FIG. 2 shows a schematic view, in partial assembly configuration, of one embodiment of the lighting device of the present invention.

FIG. 3 shows a schematic view, in partial assembly configuration, of one embodiment of the lighting device of the present invention.

DETAILED DESCRIPTION OF THE INVENTION

Figure 4:
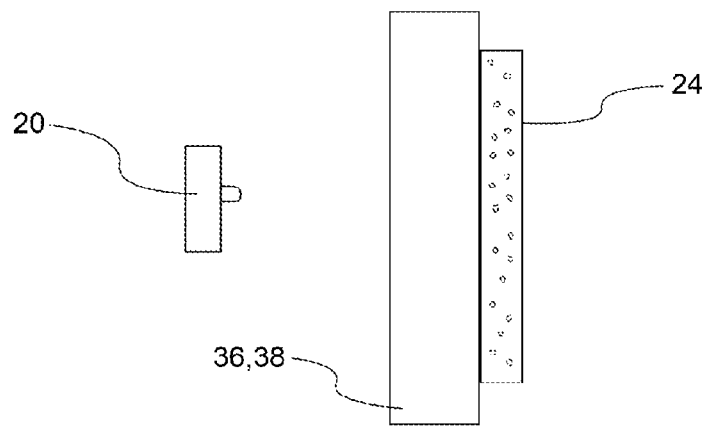
FIG. 4 shows a schematic view, in partial assembly configuration, of one embodiment of the lighting device of the present invention.
Figure 5:
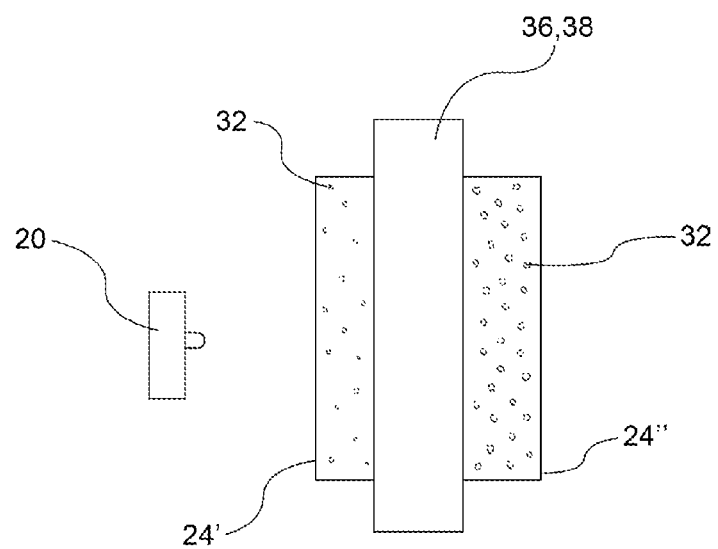
FIG. 5 shows a schematic view, in partial assembly configuration, of one embodiment of the lighting device of the present invention.

With reference to the above figures, where elements or parts of elements in common between the embodiments described below are referred to with the same reference numerals, reference numeral 4 generally indicates a lighting and/or signaling device for vehicles, such as an automotive headlight, to which the following description will refer without loss of generality. The term "automotive headlight" refers to either an automotive tail light or to an automotive headlight, the latter also known as projector, or a lamp. As is known in the art, the automotive headlight includes at least one outer vehicle light having a lighting and/or signaling function (such as a position light) which can be a front, rear, side position light, a direction indicator light, a brake light, a rear fog light, a high beam light, a low beam light, and the like. However, it is understood that in the context of the present invention, the lighting and/or signaling device for vehicles generically denotes a lighting and/or signaling device of a vehicle with at least one vehicle light having a lighting or signaling function, thus including also, for example, ceiling lights or the like installed in the vehicle. Furthermore, also the definition of automotive lighting device should be understood in the generic meaning, including a lighting device suitable for being used on any type of locomotion vehicle.

In one embodiment, the lighting and/or signaling device 4 includes a container body 8 and an outer lenticular body 12 which delimits at least partially a housing chamber 16 housing a light source 20. The light source 20 is electrically connected to an electrical connection for the powering the light source 20. In one embodiment, the light source 20 is a light emitting diode light source, i.e. LED. The container body 8 includes a mouth through which it receives and contains the various components of the lighting device 4. The container body 8 further allows the attachment of the lighting device 4 to the relative vehicle. The outer lenticular body 12 is made with a material at least partially transparent or semi-transparent, or translucent, being also able to include an opaque portion. The outer lenticular body 12 is placed for closing the mouth of the container body 8 so as to enclose the housing chamber.

In one embodiment, further components of the lighting device 4 associated with the light source 20 are arranged within the housing chamber 16. In particular, the lighting device 4 may include at least one diffuser body 24 suitable for receiving the light emitted by the light source 20 and diffusing the light externally to the diffuser body itself. The light emitted by the light source 20 is thus received and diffused by the diffuser body 24, and escapes from the lighting device 4 through the outer lenticular body 12. Unlike diffuser bodies known in the art, the diffuser body 24 of the present invention includes a solid matrix 28 of transparent or translucent polymer material, which incorporates a plurality of bubbles or cavities 32. In one embodiment, the bubbles or cavities 32 are filled with a gas. In this way, the solid matrix 28 performs the transmission of the light inside the diffuser body 24 while the bubbles 32 perform the diffusion of the light and its extraction outside the diffuser body 24 by subsequent refraction. In one embodiment, the bubbles or cavities 32 of the diffuser body 24 are closed (i.e. not intercommunicating with each other). Further, in one embodiment, the bubbles or cavities 32 of the diffuser body 24 have an average size between 1 and 200 microns. Further, in one embodiment, the diffuser body 24 has an average density of bubbles between $10^2$ and $10^9$ bubbles/$cm^3$.

In one embodiment of the present invention, the diffuser body 24 may be formed of at least one first portion 24' of diffuser body 24 encompassing a plurality of bubbles or cavities 32, having a first density and/or a first mean diameter of the bubbles or cavities 32, and a second portion 24" of diffuser body 24 encompassing a plurality of bubbles or cavities 32, having a second density and/or a second mean diameter of the bubbles or cavities 32. Such first and second portions 24', 24" of diffuser body 24 can fit together, or be separate from each other, for example by the outer lenticular body 12.

In one embodiment, the lighting device 4 includes at least one transmission element 36 suitable for receiving the light emitted by the light source 20 and transmitting it along the transmission element 36 itself. The transmission element 36, for example, is a light guide 37 as its function is to receive the light and guide it according to a predetermined path through successive internal reflections. The transmission element 36 may also include a further inner lenticular body 38, such as for example a lens, a filter, or a clear body. The latter is placed within the housing chamber and is crossed by the light emitted by the light source 20, in which the light enters from a light input surface of the inner lenticular body 38 and exits from a light output surface of the inner lenticular body 38 in quick succession. It is understood that the transmission element 36 also denotes the outer lenticular body 12. The diffuser body 24 can be at least partially applied to the transmission element 36 at an interface 40 so as to receive the light from the transmission element 36 through interface 40, and diffuse it externally to the lighting and/or signaling device 4. For example, interface 40 is a portion of outer side wall of the transmission element 36 that is covered at least partially by the diffuser body 24 so that the latter can receive the light and diffuse it. In other words, the diffuser body 24 can be applied to the transmission element 36 so as to match at least partially with the outer side wall of the transmission element 36 itself, in which such an outer side wall can represent the light output surface 41 and/or the light input surface 42 of the transmission element 36 itself, depending on the case. More precisely, when the transmission element 36 includes the inner 38 or outer lenticular body 12, the diffuser body 24 can be applied on the light output surface 41 of the lenticular body 38, 12 and/or on the light input surface 42 of the lenticular body 38, 12. When the transmission element 36 includes the light guide 37, the diffuser body 24 can be applied on a light output surface 41 of the light guide 37. The light output surface 41 thus constitutes the interface 40 between the transmission element 36 and the diffuser body 24. Specifically, the light emitted by the light source 20 can penetrate inside the light guide 37, through a light input surface 42 of the light guide 37, and be channeled inside the light guide 37 by the known phenomenon of total inner reflection, so long as the light affects an extraction surface 43 of the light guide 37.

In one embodiment, on the light extraction surface 43 of the light guide 37 there are provided light extraction elements 44, such as prisms or shaped surfaces, which serve to extract the light and channel it towards the light output surface 41 of the light guide 37, to which the diffuser body 24 may be optionally applied.

Figure 6:
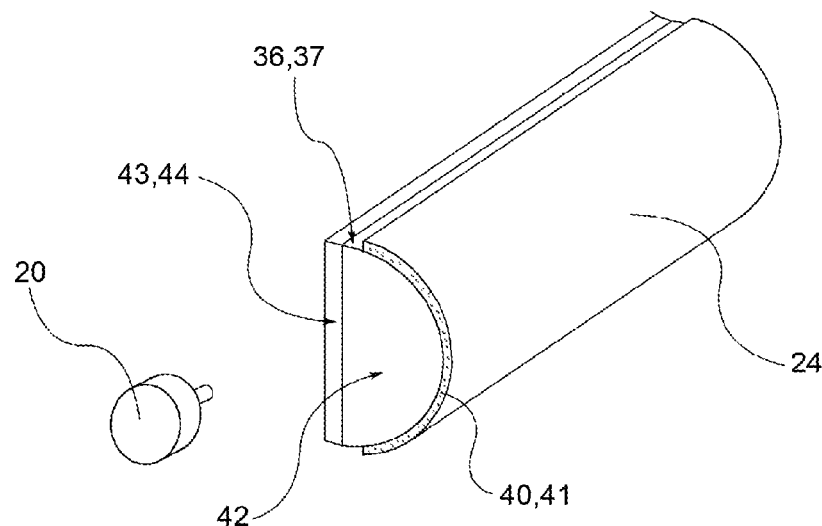
FIG. 6 shows a schematic view, in partial assembly configuration, of one embodiment of the lighting device of the present invention.
Figure 7:
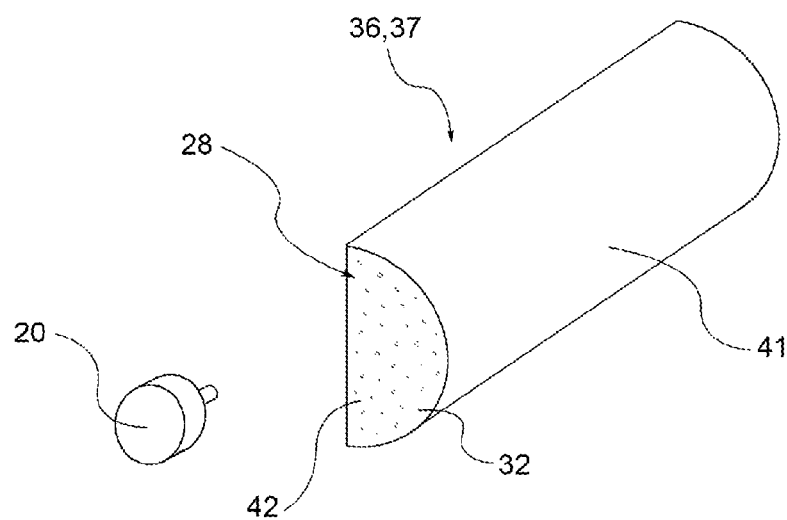
FIG. 7 shows a schematic view, in partial assembly configuration, of one embodiment of the lighting device of the present invention.

In one embodiment, the transmission element 36, be it in the form of inner lenticular body 38, outer lenticular body 12 and light guide 37, can be obtained from a body having a solid matrix 28 provided with cavities or bubbles 32 which may have an average size of between 1 and 10 microns; moreover, the cavities or bubbles 32 of the transmission element, be it in the form of inner lenticular body 38, outer lenticular body 12 and light guide 37, may have an average density between $10^2$ and $10^4$ bubbles/$cm^3$. Therefore, a light guide 37 may be entirely formed as diffuser body 24, and those having ordinary skill in the art will appreciate that the process parameters can be varied in order to determine the density and the size of the bubbles or cavities 32, inside the light guide 37, so as to allow both the channeling of the light within the light guide itself, by the known phenomenon of total inner reflection, and the diffusion of light outside the light guide 37, due to subsequent refractions due to bubbles or cavities 32 (see FIG. 6).

In one embodiment, the diffuser body 24 is made of a polymer material. Further, the diffuser body 24 and/or the transmission element 36 may be made of polycarbonate (PC) or polymethylmethacrylate (PMMA) (Plexiglas). In one embodiment, the lighting device 4 also includes a reflector, usually made of an opaque material and shaped substantially concave with a mirror-treated or metalized inner surface. Such an element has the function of reflecting and channeling the light emitted by the light source 20 towards the diffuser body 24.

The production method of a lighting and/or signalling device for vehicles includes preparing the mold, which delimits in negative the shape of the diffuser body 24 suitable for receiving the light emitted by the light source 20 so as to diffuse said light outside the diffuser body 24. Next, a transparent or semi-transparent or translucent material is brought to the molten state. Subsequently, a foaming agent, (for example, a fluid in supercritical conditions) is injected into the molten material so as to create a diffuser body 24 having a solid matrix 28 of transparent polymer material which incorporates a plurality of bubbles or cavities 32 filled with gas, after enucleation and expansion of the foaming agent itself. Such a solution of molten material and foaming agent therefore arrives within the mold, so as to be shaped and cooled. The foaming agent used may be, for example, air, nitrogen, carbon dioxide, or other gas, or a mixture thereof. The diffuser body 24 is then associated with a light source 20, structured so as to emit light when powered with electricity. More precisely, the diffuser body 24 is coupled either directly or indirectly to the light source 20, so that the diffuser body is able to receive and distribute the light emitted by the light source 20. Further, the solid matrix 28 performs the transmission of the light inside the diffuser body 24 while bubbles 32 perform the diffusion of the light and its extraction outside the diffuser body 24 by subsequent refraction.

In one embodiment, the method also includes the step of over-saturating the solid matrix of transparent, semi-transparent, or translucent material with the foaming agent, so as to obtain bubbles or cavities 32 having a size and/or density capable of imparting an opalescent appearance to the diffuser body. The bubbles or cavities 32 of the diffuser body 24 may have an average size between 1 and 200 microns. Further, the diffuser body 24 may have an average density of bubbles between 102 and 109 bubbles/$cm^3$.

In one embodiment, the method further includes the steps of molding at least one transmission element 36 suitable for receiving the light emitted by the light source 20 and transmitting it along the transmission element 36 itself. The diffuser body 24 may be applied to the transmission element 36 at an interface 40: in this way, the diffuser body 24 can receive the light from the transmission element 36 through interface 40, and can thus diffuse it externally to the lighting device 4. For example, the transmission element 36 and the diffuser body 24 are obtained by a co-molding technique, for example by an injection press with rotating mold: in this way, the at least partial coating of the transmission element 36 by a portion of diffuser body 24 is easily obtained. Further, if the transmission element includes the inner 38 or outer lenticular body 12, the diffuser body 24 is co-molded with the lenticular body, so that the latter are at least partially matching, at the light output surface of the lenticular body and/or at the light input surface of the lenticular body. If the transmission element includes a light guide, the diffuser body 24 is co-molded with the light guide so that the latter at least partially match at the light output surface of the light guide. The diffuser body 24 and/or the transmission element 36 may be made of a transparent, semi-transparent, or translucent polymer material, such as polycarbonate (PC) or polymethylmethacrylate (PMMA) (Plexiglas).

Furthermore, the production method of a lighting and/or signalling device may include the step of co-moulding the first and the second portion 24', 24" of diffuser body 24 to each other, in which the latter are provided with a plurality of bubbles or cavities 32, respectively, having different size and/or density. Further still, the method may include the step of co-moulding such first and second portions 24', 24" of diffuser body 24 with the transmission element 36.

As can be appreciated from the above description, the lighting device of the invention allows the disadvantages of the prior art to be overcome. Advantageously, the lighting device may be made at least partly by transparent polymer matrix microcell technology: the microcells are small bubbles of air or other gases formed during the injection molding process, following an enucleation of a foaming agent injected directly in the transparent polymer in the molten state. Their optical behavior is similar to that of the microspheres, with the fundamental difference that the base material is a transparent polymer not admixed with other component materials that would alter the chemical composition thereof.

The solution of the present invention in fact provides for the use of micro-bubbles, or cavities filled with gas, typically air, which improve the efficiency of the lighting device in terms of transmission and spatial diffusion of the light produced. According to the present invention, it is possible to adjust the size and number of bubbles per volume unit, thus allowing a controllable and locally configurable volumetric optical diffusion (opalescence) to be obtained. Further, the diffuser body 24 is made by conveying granules of transparent or semi-transparent, or translucent polymer material to the presses, where the foaming agent is injected for the formation of bubbles, or cavities, as previously described. In this location, it is possible to vary the density or the size of the bubbles, or cavities, by simply modifying the flow of the foaming agent, or other process parameters. In this way, the desired diffusing behavior of the diffuser body can be obtained, for example depending on the thickness of the lenticular body. This gives the dual industrial advantage of being able to produce a semi-transparent or translucent artefact, such as for example a light guide or a lenticular body, provided with the opalescence features whose base material complies with all the regulatory requirements and is globally marketable, and control the optical features of transparency and diffusion through a suitable control of the injection/dispersion process of the foaming agent.

Furthermore, it will be clear to one skilled in the art that the diffuser body can be made with a density and/or size of the bubbles variable along a determined direction within the diffuser body itself by simply varying some process parameters, such as the pressure and temperature along the mold walls.

Furthermore, the optical component such as the diffuser body, the light guide or the lenticular body, thus obtained is lighter than an equivalent component made with the microsphere technology since the gas, typically air, is much lighter than the polymer material of the microspheres themselves. In fact, the solutions with microspheres provide for the use of a polymer material or matrix which incorporates a plurality of solid particles or microspheres: therefore, the material itself has no voids or discontinuities. On the other hand, the solution of the present invention provides for the presence of a polymer matrix divided and interrupted by cavities or bubbles of gas, typically air.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A lighting device for vehicles comprising:
   a container body having an outer lenticular body that delimits, at least partially, a housing chamber;
   a light source operatively supported in said housing chamber and structured so as to emit light when powered with electricity,
   at least one diffuser body suitable for receiving the light emitted by the light source and diffusing said light externally to the diffuser body, wherein the diffuser body includes a solid matrix in transparent polymer material which encompasses a plurality of bubbles or cavities,
   wherein the solid matrix performs the of the light inside the diffuser body and wherein the bubbles or cavities have a mean dimension of more than 1 but less than 200 microns and perform the diffusion of the light and its extraction outside the diffuser body by subsequent refraction, and wherein the diffuser body has a mean density of bubbles that are more than $10^2$ but less than $10^9$ bubbles/cm$^3$;
   at least one transmission element suitable for receiving the light emitted by the light source and transmitting it along said transmission element, wherein the transmission element includes a light guide, and
   wherein the transmission element includes a body having a solid matrix provided with cavities or bubbles having a mean dimension of 1 to 10 microns and having a mean density of $10^2$ to $10^4$ bubbles/cm$^3$ and wherein said diffuser body and said transmission element are disposed adjacent to one another on said outer lenticular body.

2. The lighting device as set forth in claim 1, wherein said bubbles or cavities are filled with a gas.

3. The lighting device as set forth in claim 1, wherein the bubbles or cavities of the diffuser body are closed, and do not intercommunicate with each other.

4. The lighting device as set forth in claim 1, wherein the diffuser body includes at least one first portion of diffuser body encompassing a plurality of bubbles or cavities, having a first density and/or a first mean diameter of the bubbles or cavities, and at least one second portion of diffuser body encompassing a plurality of bubbles or cavities, having a second density and/or a second mean diameter of the bubbles or cavities, said first and second portion including a matrix of transparent, semi-transparent, or translucent material.

5. The lighting device as set forth in claim 4, wherein the first and second portion of the diffuser body fit together and are separate from each other at the interposition of an inner or outer lenticular body of the device.

6. The lighting device as set forth in claim 1, wherein the diffuser body is at least partially applied to the transmission element at an interface so as to receive the light from the transmission element through the interface, and diffuse it externally to the lighting device by the alternation between the solid matrix and the bubbles.

7. The lighting device as set forth in claim 6, wherein the transmission element includes a light guide having a light input surface which receives the light from the light source and a light output surface, acting as interface, to which the diffuser body is applied, wherein the light emitted by the light source penetrates inside the light guide and is channeled inside the light guide as long as the light affects an extraction surface of the light guide.

8. The lighting device as set forth in claim 7, wherein light extraction elements are provided on the extraction surfaces of the light guide, wherein said light extraction elements may include prisms or molded surfaces, which extract the light and convey it towards the light output surface of the light guide.

9. The lighting device as set forth in claim 1, wherein the diffuser body is made from transparent, semi-transparent or translucent polymer material.

* * * * *

UNITED STATES PATENT AND TRADEMARK OFFICE
CERTIFICATE OF CORRECTION

PATENT NO.         : 9,759,395 B2                        Page 1 of 1
APPLICATION NO.    : 14/222907
DATED              : September 12, 2017
INVENTOR(S)        : Franco Marcori et al.

It is certified that error appears in the above-identified patent and that said Letters Patent is hereby corrected as shown below:

In the Claims

Column 8, Line 37 (Claim 1) delete "the of the" and insert therefor --the transmission of the--.

Signed and Sealed this
Second Day of January, 2018

Joseph Matal
*Performing the Functions and Duties of the*
*Under Secretary of Commerce for Intellectual Property and*
*Director of the United States Patent and Trademark Office*